(12) United States Patent
Yamaguchi et al.

(10) Patent No.: US 6,532,107 B2
(45) Date of Patent: Mar. 11, 2003

(54) OPTICAL AMPLIFIER, LIGHT SOURCE MODULE AND OPTICAL SYSTEM

(75) Inventors: Takeharu Yamaguchi, Chiyoda-ku (JP); Hideo Aoyagi, Chiyoda-ku (JP); Toshiaki Tsuda, Chiyoda-ku (JP); Yuichiro Irie, Chiyoda-ku (JP); Etsuji Katayama, Chiyoda-ku (JP); Takeo Shimizu, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/895,256

(22) Filed: Jul. 2, 2001

(65) Prior Publication Data
US 2002/0039227 A1 Apr. 4, 2002

(30) Foreign Application Priority Data
Jun. 30, 2000 (JP) ......................................... 2000-197548

(51) Int. Cl.$^7$ ................................................. H01S 3/00
(52) U.S. Cl. ..................................................... 359/341.3
(58) Field of Search ............................ 359/341.3; 372/6, 372/9

(56) References Cited

U.S. PATENT DOCUMENTS 5,995,275 A * 11/1999 Sugaya ........................ 359/341
6,256,138 B1 * 7/2001 Huang ....................... 359/337.2
6,370,180 B2 * 4/2002 Zenteno ........................ 372/96

* cited by examiner

*Primary Examiner*—Mark Hellner
(74) *Attorney, Agent, or Firm*—Oblon, Spivak, McClelland, Maier & Neustadt, P.C.

(57) ABSTRACT

An optical amplifier of the present invention comprises a pumping light source configured to output a pumping light, an amplifier unit configured to receive the pumping light from said pumping light source and amplify an optical signal that passes therethrough, and an optical fiber disposed between said pumping light source and said amplifier unit, said optical fiber including an optical filter that is configured to attenuate the optical signal from said amplifier unit.

18 Claims, 10 Drawing Sheets

OPTICAL AMPLIFIER, LIGHT SOURCE MODULE AND OPTICAL SYSTEM

BACKGROUND OF THE INVENTION

The present invention relates to an optical amplifier, light source module and optical system.

In general, the optical amplifier can amplify optical signals by using optical fibers doped with a rare-earth element such as erbium (Er), without light-electricity conversion.

Figure 10:
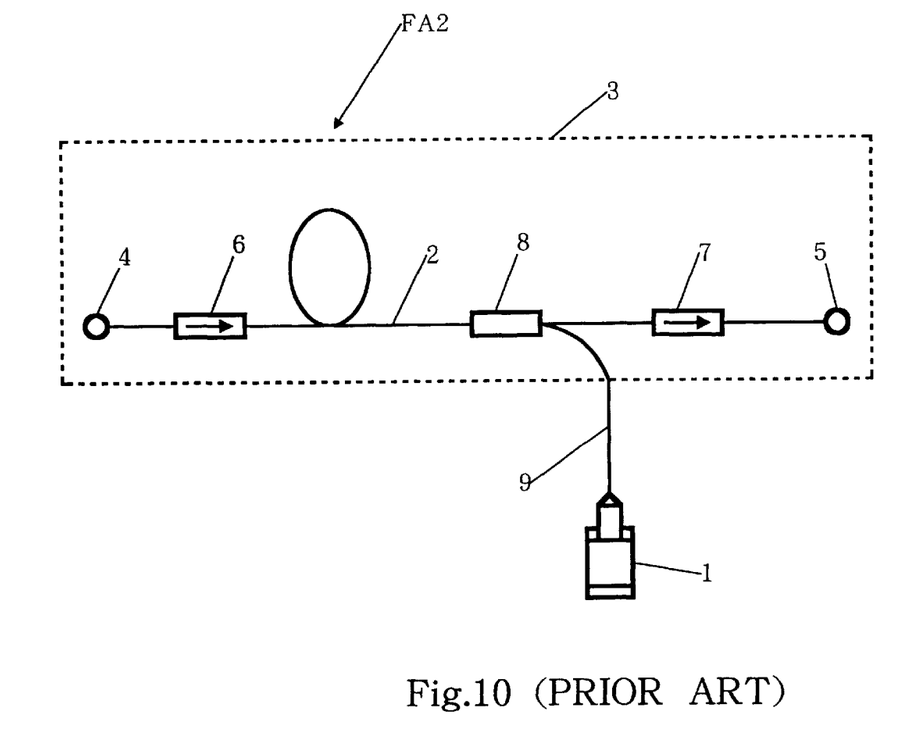
FIG. 10 is a block diagram of an optical amplifier constructed according to the prior art.

FIG. 10 is a block diagram of an optical amplifier FA2 constructed according to the prior art. As shown in this figure, the optical amplifier FA2 has a pumping light source 1 configured to output a pumped light and an amplifier unit 3 configured to receive the pumped light from the pumping light source 1 through a first optical fiber 2 and amplify and output the optical signal inputted into the first optical fiber 2.

The pumping light source 1 may be in the form of a semiconductor laser module (LD module) and designed to output a pumped light of 980 nm band, for example.

The first optical fiber 2 may be in the form of an optical fiber doped with erbium (Er), for example, when an optical signal of 1550 nm band is to be amplified.

The amplifier 3 comprises an input terminal 4 configured to receive the optical signal, an output terminal 5 configured to output the amplified optical signal, first and second isolators 6, 7 configured to propagate the optical signal only in a direction from the input terminal 4 to the output terminal 5 while preventing the optical signal from transmitting in the opposite direction, and an optical multiplexer 8 which may be in the form of an optical coupler for multiplexing the optical light transmitting through the first optical fiber 2 with the pumped light supplied from the pumping light source 1 through the second optical fiber 9.

The optical signal from the input terminal 4 is inputted into the optical multiplexer 8 through the first optical fiber via the first isolator 6. On the other hand, the pumping light from the pumping light source 1 is inputted into the optical fiber 2 through the second optical fiber 9 and optical multiplexer 8.

The optical fiber 2 is pumped by the inputted pumping light to amplify the optical signal which is in turn outputted from the output terminal 5 through the optical multiplexer 8 and second isolator 7.

SUMMARY OF THE INVENTION

An optical amplifier of the present invention comprises a pumping light source configured to output a pumping light, an amplifier unit configured to receive the pumping light from said pumping light source and amplify an optical signal that passes therethrough, and an optical fiber disposed between said pumping light source and said amplifier unit, said optical fiber including an optical filter that is configured to attenuate the optical signal from said amplifier unit.

A light source module of the present invention comprises a light source configured to output a laser beam, an optical fiber configured to have said laser beam propagate therethrough, and an optical filter disposed in said optical fiber and configured to attenuate light having a first wavelength band that is different from a second wavelength band in said laser beam.

An optical system of the present invention comprises a first optical device configured to emit a light having a first wavelength band, a second optical device configured to emit a light having a second wavelength band, means for connecting said first and second optical devices, and an optical part configured to propagate the light having the second wavelength band from said second optical device to said first optical device through said connecting means, said optical part being configured to prevent the light having the first wavelength band from said first optical device to enter said second optical device through said connecting means and also to return from said connecting means or said second optical device back to said first optical device.

A method for generating pump light for an optical amplifier of the present invention comprises steps of;
emitting a light in a first optical bandwidth from a first optical device;
emitting another light in a second optical bandwidth from a second optical device;
passing the another light through a connecting portion from said first optical device to said second optical device, including sub-steps of,
preventing light in the first optical bandwidth from said first optical device from entering said second optical device, and also returning to said first optical device from at least one of said second optical device and the connecting portion.

A light source for an optical amplifier of the present invention comprises means for emitting a light in a first optical bandwidth, means for emitting another light in a second optical bandwidth, means for passing the another light to said means for emitting a light, including, means for preventing light in said first optical bandwidth from entering said means for emitting the another light, and also returning to said means for emitting a light from at least one of said means for emitting the another light and said means for passing.

DETAILED DESCRIPTION

Several embodiments of the present invention will now be described with reference to the drawings, in comparison with the prior art.

In the optical amplifier FA2 of the prior art shown in FIG. 10, a light escaped from the amplifier 3 may reach the pumping light source 1 through the second optical fiber 9. The light escaped out of the amplifier 3 may cause noise components disturbing the light emitting action in the pumping light source 1. In addition, the escaped light may be reflected at the reflecting point within the pumping light source 1 (e.g., one terminal of the optical fiber) to form a reflected returning light which may cause noise components disturbing the amplification in the amplifier 3.

Form experiments, the inventors have found that the reflectivity in the light having its wavelength of 1545 nm band in a pumping light source 1 consisting of a 980 nm band LD module varied between −5 dB and −13 dB depending on the type of machine. This is because many 980 nm band LD modules were designed taking no account of the reflection particularly in 1550 nm band. Thus, the amount of reflected light returned to the amplifier 3 will also vary. It is thus very difficult to regulate the amplification of light. If the design of the LD module or a laser chip within the LD module is changed taking account of the reflection in 1550 nm band, the other characteristics of the LD module (e.g., output power or the like) will be restricted.

There was thus proposed a technique which prevented the returned light from the amplifier 3 from passing through the second optical fiber 9 by an optical isolator formed between the pumping light source 1 and the optical multiplexer 8. Such a technique will be referred to the first prior art.

There was also proposed another technique by which a WDM coupler is provided between the pumping light source 1 and the optical multiplexer 8, a port of that WDM coupler outputting the returned light from the amplifier 3 being connected to a terminator for terminating the reflection. This technique will be referred to the second prior art.

However, the optical isolator used in the first prior art is expensive and larger in size. The optical amplifier FA2 will be produced with an increased cost and increased in size. A holder for holding the optical parts of the optical isolator and other members are made of iron alloy. Since the iron alloy absorbs the light components in 980 nm band, a problem is raised in that the optical isolator cannot be used when the pumping light source 1 of 980 nm band is to be used.

Since the WDM coupler used in the second prior art requires the configuration of optical fiber that is 2×1, the management of optical fiber in the interior of the device becomes inconvenient with increase of points to be fused. Moreover, it is substantially essential that the WDM coupler includes a reinforcing sleeve. This correspondingly increases the entire volume. If the rigid sleeve is larger in diameter, it is also inconvenient to house or handle the sleeve within the device.

Thus, there is always the possibility raising the similar problems in an optical system in which optical devices such as amplifier, pumping light source and so on are connected to one another through connection means such as optical fibers or the like.

Figure 1:
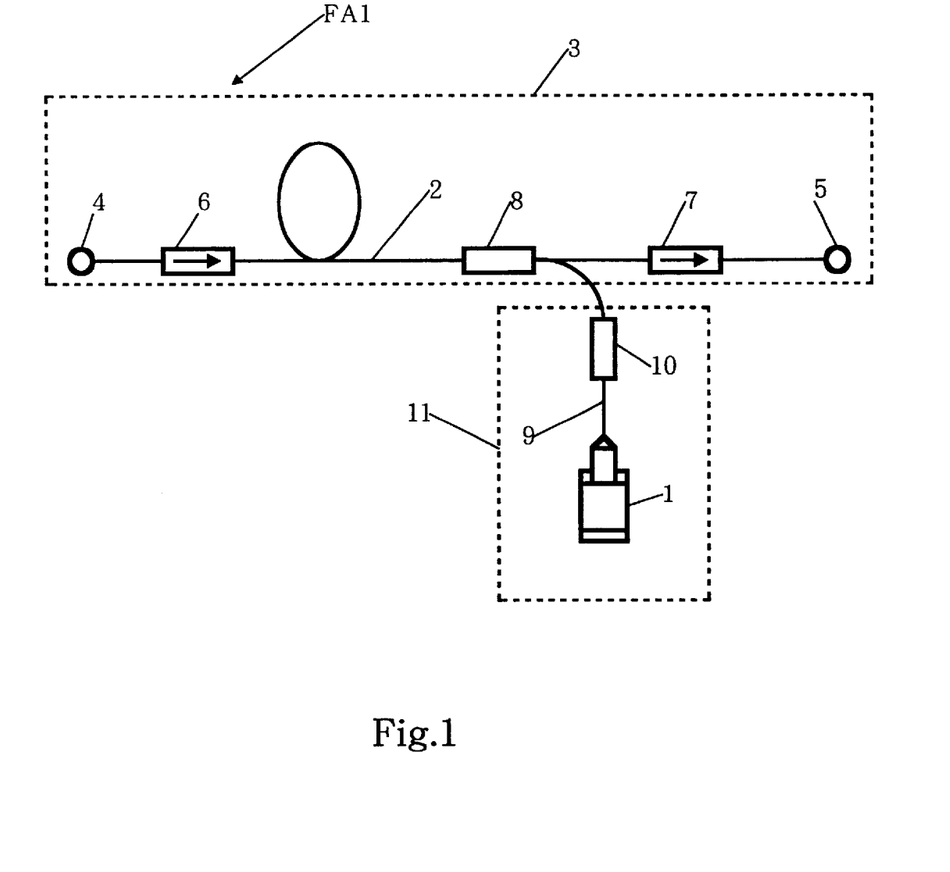
FIG. 1 is a block diagram of an optical amplifier constructed according to one embodiment of the present invention.

On the contrary, one embodiment of the present invention as shown in FIG. 1 is characterized by that the second optical fiber 9 connecting between the pumping light source 1 and the amplifier unit 3 includes an optical filter 10. The optical filter 10 can attenuate the light from the amplifier 3 by causing it to emit to the clad mode in the second optical fiber 9. In addition, a pumping light source module 11 is formed by the pumping light source 1 and the optical filter 10.

The optical filter 10 may be in the form of a long-period fiber grating (LPG) having refractive index stripes in which the refractive index in the core of the optical fiber periodically varies in the direction of optical axis. LPG has its grating period about 100 times larger than that of a short-period grating for the normal reflection, that is, between about 100 μm and about 1000 μm.

Figure 2:
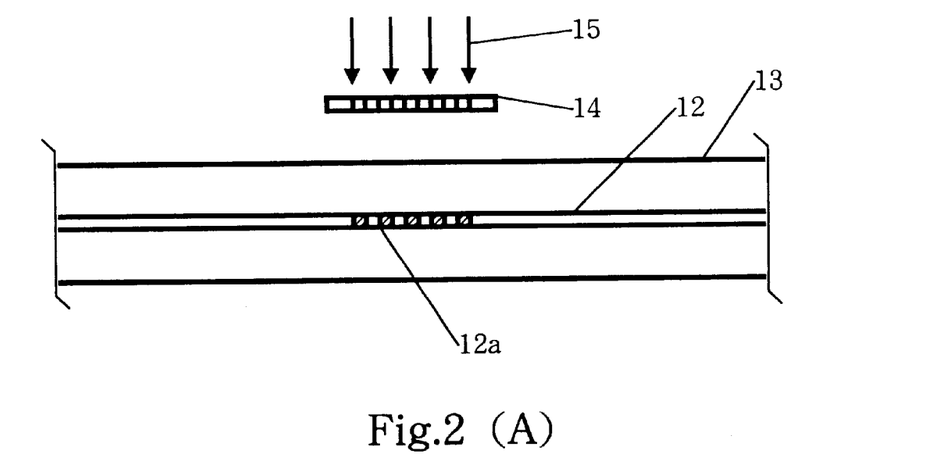
FIG. 2(A) illustrates a process of producing LPG which is usable in the optical amplifier according to the embodiment of the present invention.
FIG. 2(B) illustrates the operation of LPG.

When LPG is to be produced, a long-period mask 14 is first placed on the top of an optical fiber 13 having a core 12 which is made of germanium-doped quartz, as shown in FIG. 2(A). The long-period mask 14 may be formed by forming a plurality of thin slit on a metal sheet with a predetermined spacing or by depositing a multi-layer dielectric film on a quartz glass plate. Ultra-violet rays 15 are then irradiated onto the long-period mask 14, for example, from an argon laser. The core 12 irradiated by the ultra-violet rays 15 is increased in refractive index to form refractive-index stripes 12a. Thus, LPG will be formed.

This LPG is then used in the optical filter 10, so that a pumping light of λ2 wavelength (e.g., 980 nm band) from the pumping light source 1 passes through the waveguide of the optical fiber while the optical signal of λ1 wavelength (e.g., 1550 nm band) escaped from the amplifier 3 is emitted and attenuated to the clad mode of the optical fiber (see FIG. 2(B)). Even though the light of λ1 wavelength is reflected and returned from the pumping light source 1, it will be again attenuated by the optical filter 10. Therefore, the amount of light returned back to the amplifier 3 can highly be reduced.

Figure 7A:
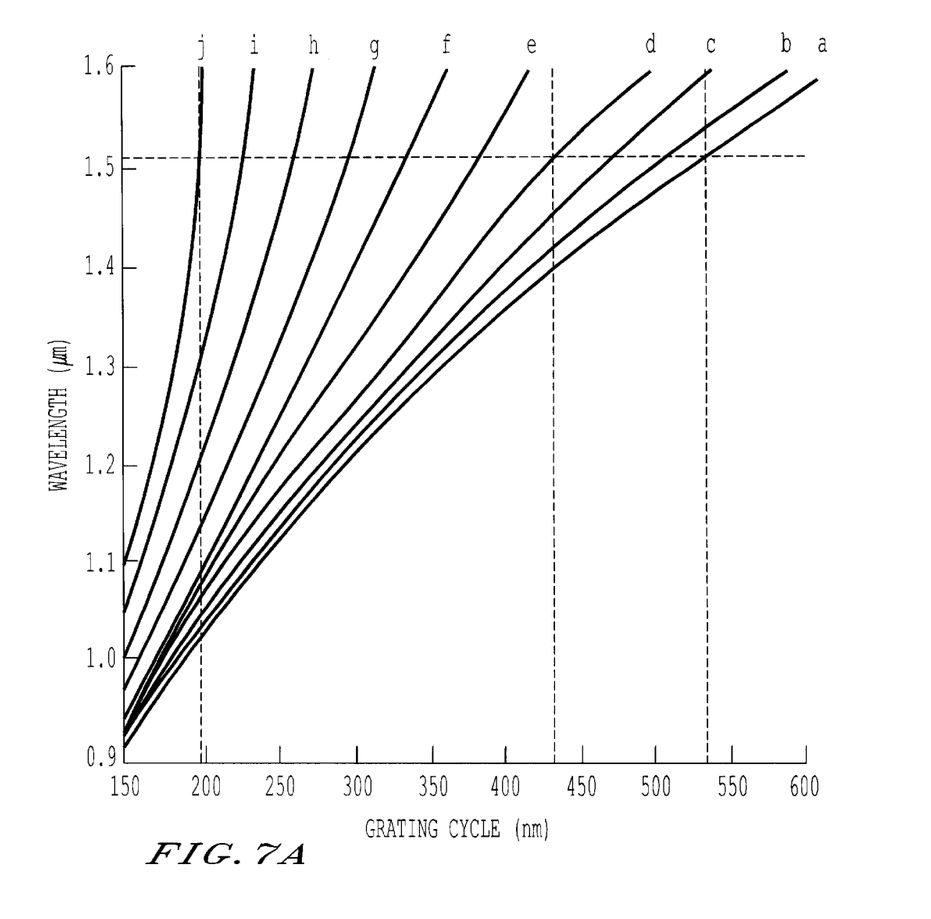
FIG. 7(A) is a graph illustrating the relationship between the grating cycle of the optical fiber and the coupling wavelength of the optical fiber.

The grating period will now be described. FIG. 7(A) is a graph illustrating the relationship between the grating period and the coupling wavelength in the optical fiber.

Characteristic lines a to j in FIG. 7(A) show wavelengths at each of which its loss of light transmission peaks. In this specification, therefore, the above coupling wavelengths will be referred to peak wavelengths of light transmission loss in the first through N-th order modes (wherein N=10). In FIG. 7(A), the characteristics lines a to j respectively represent the peak wavelengths of light transmission loss in the first through tenth modes in the described order starting from the right side of this figure. These values shown in FIG. 7(A) were measured at 25° C.

As will be apparent from FIG. 7(A), for example, if the grating period (fiber grating period) forming an optical fiber is between 150 μm and about 580 μm, the peak wavelengths of light transmission loss in plural order modes can be formed within a range of wavelength between 0.9 μm (900 nm) and 1.6 μm (1600 nm). Moreover, the peak wavelength in each of the first through N-th order modes can freely be determined by changing its fiber grating period.

Figure 7B:
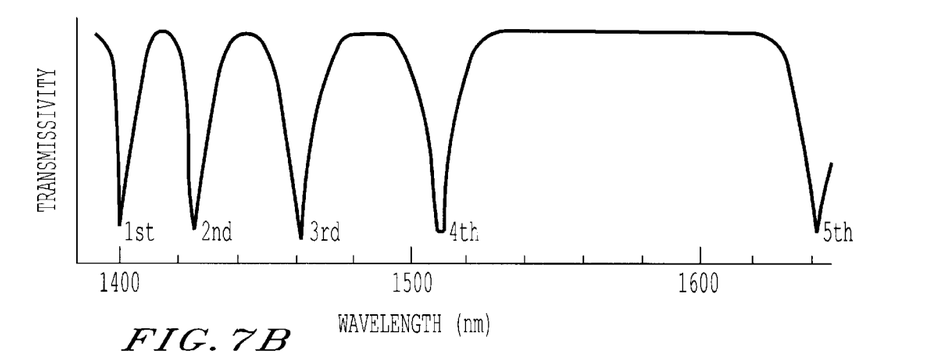
FIG. 7(B) is a graph illustrating a loss of light transmission created in the optical fiber when the grating cycle of the optical fiber is about 440 nm.

For example, if the grating period is about 440 nm, the peak wavelengths of light transmission loss in the first through fifth order modes can be formed, as shown in FIG. 7(B). If a mode is set to be the fourth order mode, the peak wavelengths of light transmission loss in the fourth order mode becomes equal to about 1510 nm. The peak wavelengths of light transmission loss in the next mode (i.e., the fifth order mode) becomes longer than 1610 nm (about 1640 nm in this figure). In any zone having its longer wavelength (e.g., from 1540 nm to 1610 nm), the difference between the maximum and minimum values in the loss of light transmission is smaller than 0.5 dB. This substantially flattens the characteristic curve. In such LPG's, the jacket in the optical fiber is stripped to expose the glass area when the grating is to be produced. If the exposed portion is again covered with the jacket through a recoat technique, however, such an optical fiber can be housed or handled in the same manner as in the conventional optical fibers, since the appearance of the recoated optical fiber is not different from those of the conventional optical fibers.

Figure 3:
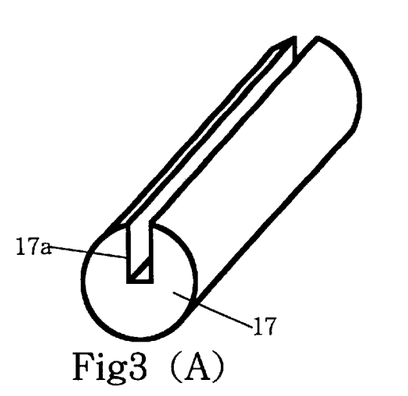
FIG. 3 shows two examples of a protecting member for protecting a grating portion in an optical filter: (A) and (B) are perspective views thereof; (C) and (D) are side cross-sectional views thereof; and (E) and (F) are front cross-sectional view thereof, respectively.

FIGS. 3(A) and (B) shows different examples of a protecting member 17 for protecting the grating portion 17 of the optical filter 10. The protecting member 17 shown in FIG. 3(A) is applied as shown in FIGS. 3(C) and (E) while the protecting member 17 shown in FIG. 3(B) is applied as shown in FIGS. 3(D) and (F). As shown in FIG. 3, it is preferred in LPG that the grating portion 16 is housed in the protecting member 17 made from quartz. Thus, the grating portion 16 can be prevented from being externally influenced by the protecting member 17 to maintain the characteristic of light transmission loss.

The protecting member 17 may be formed into a cylindrical configuration and with a groove 17a for holding the grating portion 16, as shown in FIGS. 3(A) and (E). The protecting member 17 may also be formed by a pair of split sleeves which can be abutted with each other to form a cylindrical configuration, as shown in FIGS. 3(B) and (F). As shown in FIGS. 3(C) and (D), the grating portion 16 is bonded to the opposite ends of each of the protecting member 17 through an adhesive 18.

Figure 4:
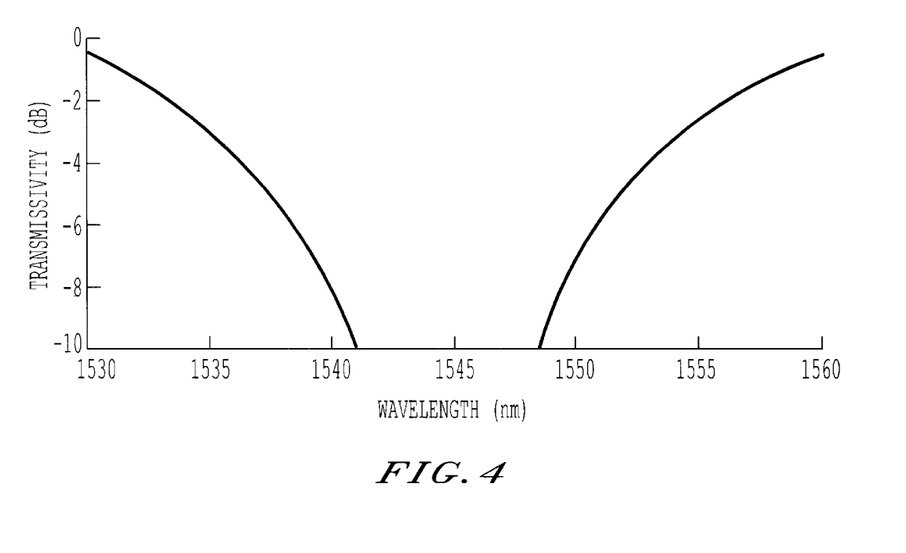
FIG. 4 is a graph illustrating the transmission characteristics obtained when LPG is mounted on the tip of a pigtail fiber in a 980 nm band LD (laser diode) module.

FIG. 4 is a graph illustrating the characteristic of transmissivity when LPG is mounted on the tip of a pig-tail fiber in a 980 nm band LD module. The LPG is 22 mm length and has its central wavelength (or peak wavelength of light transmission loss) equal to 1545 nm.

The characteristic of transmissivity of the LPG shown in FIG. 4 relates to the transmission of light in one direction. Since the returned light from the pumping light source 1 will passes through the LPG at twice, the transmissivity will be two times larger than that of FIG. 4 in conversion into dB.

For example, the transmissivity may be equal to or lower than −6 dB in the range of 12 nm between 1539 nm and 1551 nm. Even if an LD module having the maximum reflectivity within this range of wavelength is used, a loss $$-5\ dB + (-6\ dB) \times 2 = -17\ dB$$

will be obtained. The entire system will be improved even by 12 dB.

The inventors had prepared two long-period grating (LPB) samples in which the central wavelengths (or peak wavelengths of light transmission loss) thereof had been about 1545 nm. These samples will be referred to sample S1 and S2. The two samples had been used to measure the light reflectivity relating to the light of 1550 nm band wavelength.

Figure 8A:
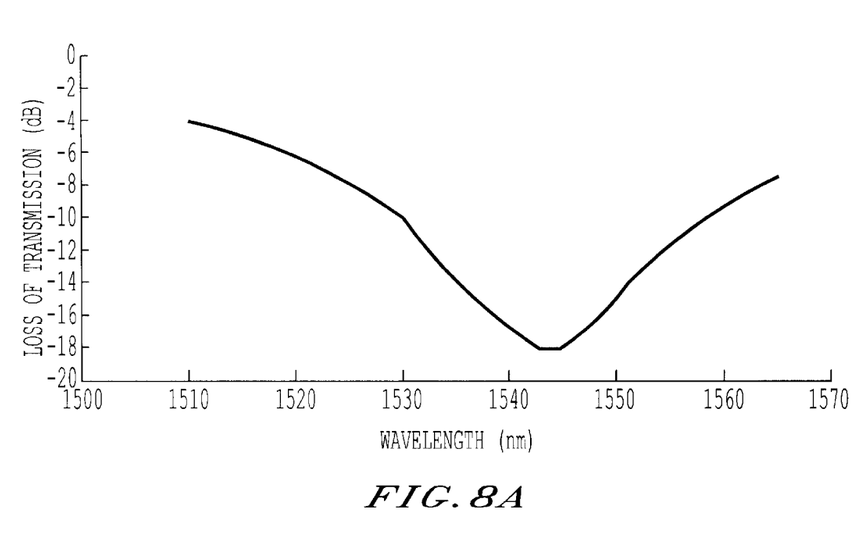
FIG. 8(A) is a graph illustrating the loss of transmission in a sample S1.
Figure 8B:
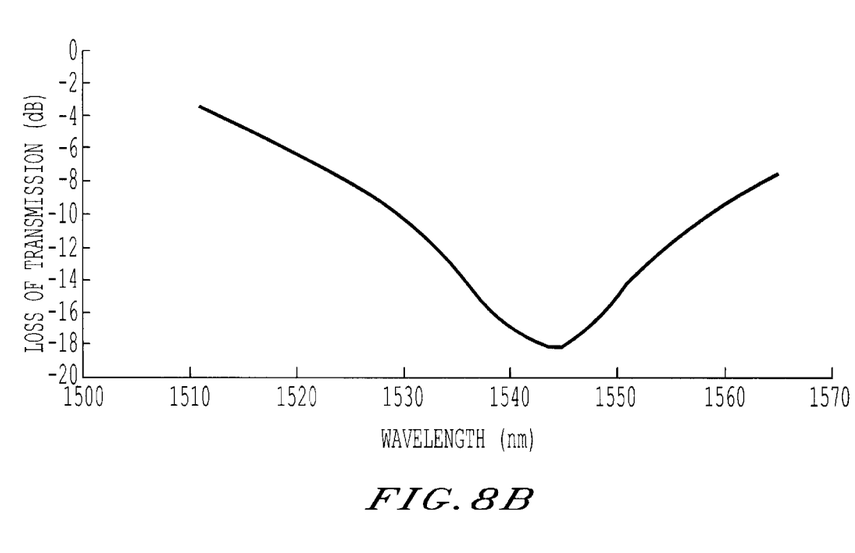
FIG. 8(B) is a graph illustrating the loss of transmission in another sample S2.

The losses of transmission in the samples S1 and S2 are shown in FIGS. 8(A) and (B), respectively. The losses of transmission in the samples S1 and S2 in the 1550 nm band were about −15 dB, as shown in FIG. 8.

Figure 9:
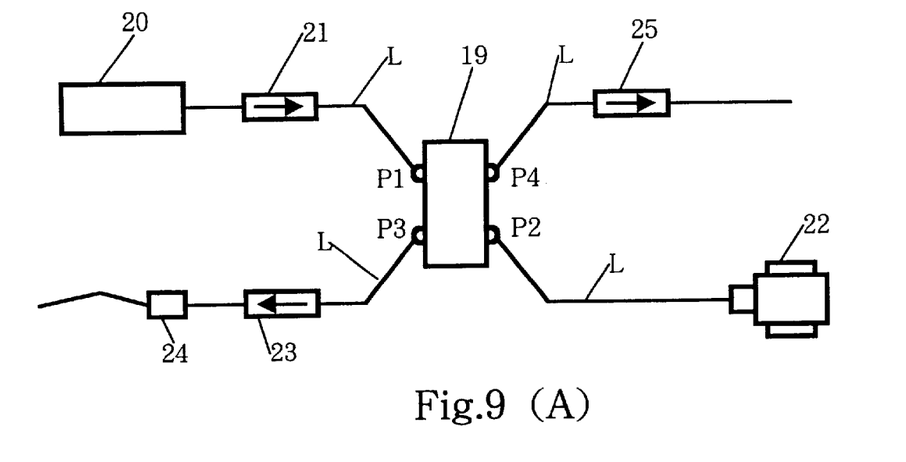
FIG. 9 illustrates a process of experiment which was performed by the inventors.

FIG. 9 illustrates a process of experiment carried out by the inventors. As shown in FIG. 9, an optical coupler 19 having first to fourth ports P1 to P4 is provided. A light from a signal light source 20 in 1550 nm band is inputted into the first port P1 of the optical coupler through an optical isolator 21. The inputted light is then branched into two light parts which are in turn outputted from the second and fourth ports P2, P4, respectively. A light from a 980 nm band LD module 22 is inputted into the second port P2 of the optical coupler 19. Similarly, this light is divided and outputted from the first and third ports P1, P3, respectively.

The light outputted from the third port P3 of the optical coupler 19 is then inputted into an optical output meter 24 through an optical isolator 23. The light outputted from the fourth port P4 of the optical coupler 19 is terminated without reflection by an optical isolator 25. In FIG. 10, L denotes an optical fiber.

The optical output meter 24 was used to measure the light reflectivity of the 980 nm band LD module in 1550 nm band before and after the long-period grating samples S1 and S2 were mounted between the 980 nm band LD module 22 and the optical coupler 19 (see FIGS. 10 (A) and (B)).

TABLE 1

|  | Before Mounted | After Mounted | Difference |
|---|---|---|---|
| Sample S1 | −10.5 dB | −37.6 dB | −27.1 dB |
| Sample S2 | −9.8 dB | −36.2 dB | −26.4 dB |

Table 1 shows the results of experiment. As will be apparent from Table 1, the sample S1 shows an improvement by 27.1 dB while the sample S2 indicates an improvement by 26.4 dB. When the long-period grating is mounted between the 980 nm band LD module 22 and the optical coupler 19, it is therefore found that the light reflectivity of the 980 nm band LD module 22 in 1550 nm band is greatly reduced.

Since this embodiment of the present invention is configured that the optical filter 10 configured to emit and attenuating the light from the amplifier 3 to the clad mode of the second optical fiber 9 is located in the second optical fiber 9 connecting between the pumping light source 1 and the amplifier 3, it can be prevented that the light escaped out of the amplifier 3 reaches the pumping light source 1 through the second optical fiber 9. Moreover, even though the light is reflected at the reflecting point in the pumping light source 1 (e.g., the end of the optical fiber), the reflected light can be prevented from reaching the amplifier 3. As a result, noise components that may disturb the light-emission and amplification in the pumping light source 1 and amplifier 3 can be reduced to improve the reliability in the optical amplifier FA1 and pumping light source module 11.

If the optical filter 10 is LPG, the system can be reduced in size and manufacturing cost since the fiber grating is very small and inexpensive with the sleeve portion being not frequently required. Therefore, the present invention can provide the optical amplifier, pumping light source module and optical system in which the optical fiber can more easily be managed without increase of points to be fused and which are superior in housing and handling properties.

Figure 5A:
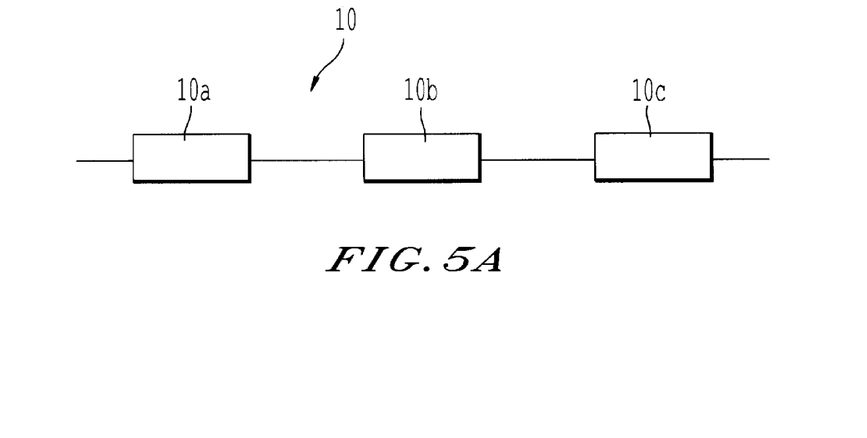
FIG. 5(A) is a block diagram of an optical filter usable in an optical amplifier according to another embodiment of the present invention.
Figure 5B:
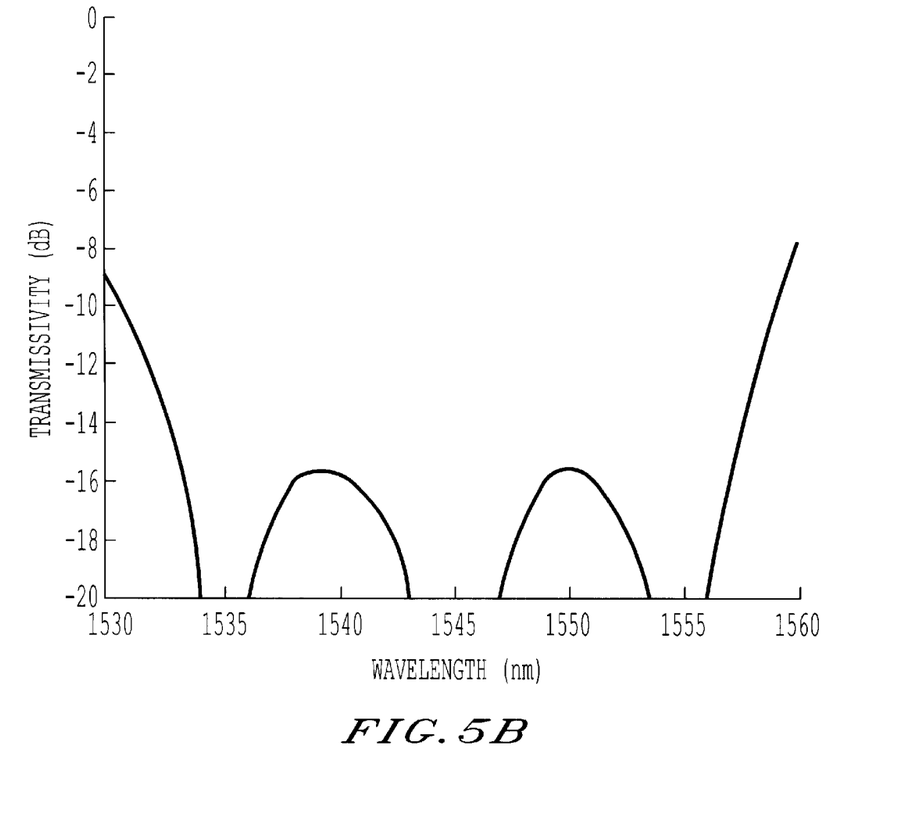
FIG. 5(B) is a graph illustrating the relationship between the transmissivity and the wavelength of the optical filter.

FIG. 5(A) is a block diagram of an optical filter 10 usable in an optical amplifier FA1 that is constructed according to another embodiment of the present invention while FIG. 5(B) is a graph illustrating the characteristic of transmissivity in such an optical filter 10.

As shown in FIG. 5(A), this second embodiment is characterized by that three LPG's 10a, 10b and 10c respectively having central wavelengths of 1535 nm, 1545 nm and 1555 nm are connected in series to one another. In this case, the net transmissivity is as shown in FIG. 5(B). The width of wavelength having a transmissivity equal to or higher than −6 dB can be enlarged to be equal to or larger than 30 nm.

Figure 6:
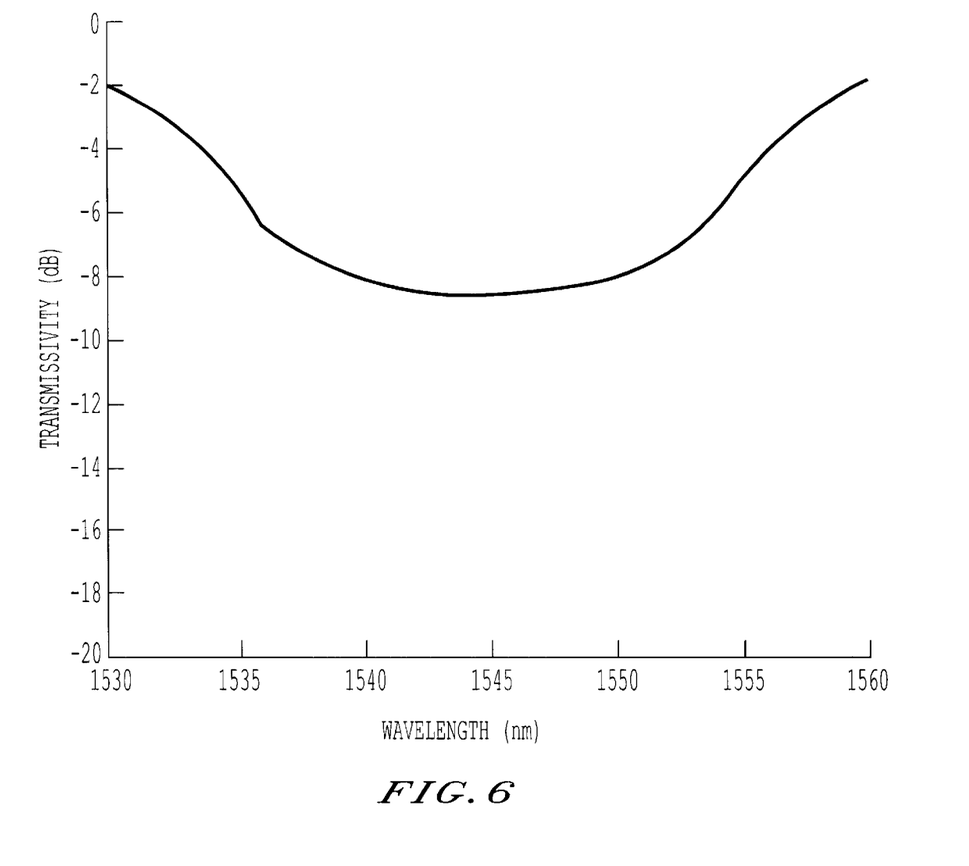
FIG. 6 is a graph illustrating the transmission characteristics obtained when 11 LPG's each of 2 mm length are connected directly with one another.

FIG. 6 is a graph illustrating a characteristic of transmissivity when 11 LPG's each having a length of 2 mm are connected in series to one another. At this time, the central wavelengths of the 11 LPG's were set to exist between 1535 and 1555 nm with intervals of 2 nm. The total length of the LPG array is 22 nm as in FIG. 4. Such a multi-stage connection can enlarge the range of wavelength for obtaining the transmissivity of −6 dB in the same LPG length to 17 nm between 1536 nm and 1553 nm. The increase in the number of LPG stages is equivalent to that the grating period is continuously varied from one side of an LPG to the other side (which can be referred to a so-called chirped grating). The chirped grating is effective for reducing the reflectivity over a widened band.

The present invention is not limited to the aforementioned embodiments, but may be carried out in any of various changed or modified forms without departing from the spirit and scope of the invention as claimed in the appending claims.

Although the aforementioned embodiments have been described as to the optical filter 10 of LPG, the present invention may similarly utilize any means unless it forms the clad mode. For example, the present invention can provide the same advantage even by formation of a reflection type secondary grating.

Moreover, the present invention may control the core profile of an optical fiber to give the optical fiber a predetermined bending without use of the grating. When the optical fiber has a bending, the refractive index in the core may vary. This provides such an advantage that the light of 980 nm band can substantially pass through the optical fiber, but the light of 1550 nm joints to the emission mode. Since the light is taken out from the side of shorter wavelength if the optical fiber is bent, such a structure may be applied to a case where the light from the side of shorter wavelength is to be attenuated.

The light of emission mode will float in the clad mode, but not joint to the waveguide mode. If a light included in the clad mode must also be considered, a material that can absorb the light from the amplifier 3 may be located between the clad and the jacket to absorb the clad mode light.

What is claimed is:

1. An optical amplifier comprising:
   a pumping light source configured to output a pumping light;
   an amplifier unit configured to receive the pumping light from said pumping light source and amplify an optical signal that passes therethrough; and
   an optical fiber disposed between said pumping light source and said amplifier unit;
   said optical fiber including a long period grating that is configured to attenuate the optical signal from said amplifier unit.

2. The optical amplifier according to claim 1 wherein:
   said amplifier unit is configured to amplify the optical signal, said optical signal having a first wavelength band; said pumping light having a second wavelength band different from said first wavelength band, and
   said long period grating being configured to radiate the optical signal having said first wavelength band to a clad mode of said optical fiber so as to attenuate the first wavelength band, said long period grating being configured to permit the second wavelength band of the pumping light to pass therethrough.

3. The optical amplifier according to claim 1 wherein said amplifier unit includes an optical fiber doped with Er as an amplifying medium.

4. The optical amplifier according to claim 1 wherein the wavelength band of said pumping light is 980 nm and the wavelength band of said optical signal is 1550 nm.

5. The optical amplifier according to claim 1 further comprising a protecting member configured to house said long period grating.

6. A light source module comprising:
   a light source configured to output a laser beam;
   an optical fiber configured to have said laser beam propagate therethrough; and
   a long period grating disposed in said optical fiber and configured to attenuate light within a wavelength band that is different from a wavelength band of said laser beam.

7. The light source module according to claim 6 wherein said long period grating is configured to attenuate an optical signal amplified by an optical amplifier pumped by said laser beam.

8. The light source module according to claim 6 wherein said long period grating is configured to radiate the attenuated light to a clad mode of the optical fiber.

9. The light source module according to claim 6 wherein the wavelength band of the laser beam from said light source is 980 nm.

10. The light source module according to claim 6 further comprising a protecting member configured to house said long period grating.

11. An optical system comprising:
    a first optical device configured to emit a light having a first wavelength band;
    a second optical device configured to emit a light having a second wavelength band;
    means for connecting said first and second optical devices; and
    a long period grating configured to propagate the light having the second wavelength band from said second optical device to said first optical device through said means for connecting, said long period grating being configured to prevent the light having the first wavelength band from said first optical device from entering said second optical device through said means for connecting and also from returning from said means for connecting or said second optical device back to said first optical device.

12. A method for generating pump light for an optical amplifier, comprising steps of:
    emitting a light in a first optical bandwidth from a first optical device;
    emitting another light in a second optical bandwidth from a second optical device;
    passing the another light through a connecting portion from said first optical device to said second optical device, including sub-steps of,
    preventing light in the first optical bandwidth from said first optical device from entering said second optical device, and also returning to said first optical device from at least one of said second optical device and the connecting portion, said preventing step including applying said light in said first optical bond to a long period grating.

13. A light source for an optical amplifier, comprising:

means for emitting a light in a first optical bandwidth;

means for emitting another light in a second optical bandwidth;

means for passing the another light to said means for emitting a light, including, means for preventing light in said first optical bandwidth from entering said means for emitting the another light, and also returning to said means for emitting a light from a least one of said means for emitting the another light and said means for passing, said means for preventing including a long period grating.

14. An optical amplifier comprising:

a pumping light source configured to output a pumping light;

an amplifier unit configured to receive the pumping light from said pumping light source and amplify an optical signal that passes therethrough; and an optical fiber disposed between said pumping light source and said amplifier unit, said optical fiber including a plurality of long period gratings arranged in series and configured to attenuate the optical signal from said amplifier unit, and having respective peak wavelengths of transmission loss spectra that are different from one another.

15. An optical amplifier comprising:

a pumping light source configured to output a pumping light;

an amplifier unit configured to receive the pumping light from said pumping light source and amplify an optical signal that passes therethrough; and an optical fiber disposed between said pumping light source and said amplifier unit, said optical fiber including a chirped grating with a continuously varying period from one end of the optical fiber to the other and is configured to attenuate the optical signal from said amplifier unit.

16. The optical amplifier according to claim 15 further comprising a protecting member configured to house said chirped grating.

17. A light source module comprising:

a light source configured to output a laser beam;

an optical fiber configured to have said laser beam propagate therethrough; and a plurality of long period gratings disposed in said optical fiber and arranged in series, said plurality of long period gratings configured to attenuate light within a wavelength band that is different from a wavelength band of said laser beam and having respective peak wavelengths of transmission loss spectra that are different from one another.

18. A light source module comprising:

a light source configured to output a laser beam;

an optical fiber configured to have said laser beam propagate therethrough; and a chirped grating disposed in said optical fiber, said chirped grating having a continuously varying period from one end of the optical fiber to the other, and configured to attenuate light within a wavelength band that is different from a wavelength band of said laser beam.

* * * * *